Oct. 31, 1933.　　　　　L. H. THOEN　　　　　1,932,714
HARVESTER
Filed May 28, 1929
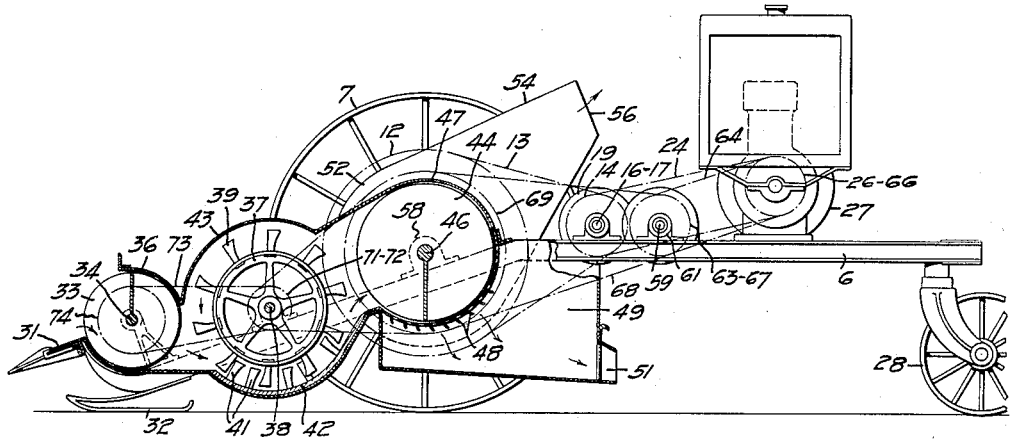
FIG_2.
FIG_1.
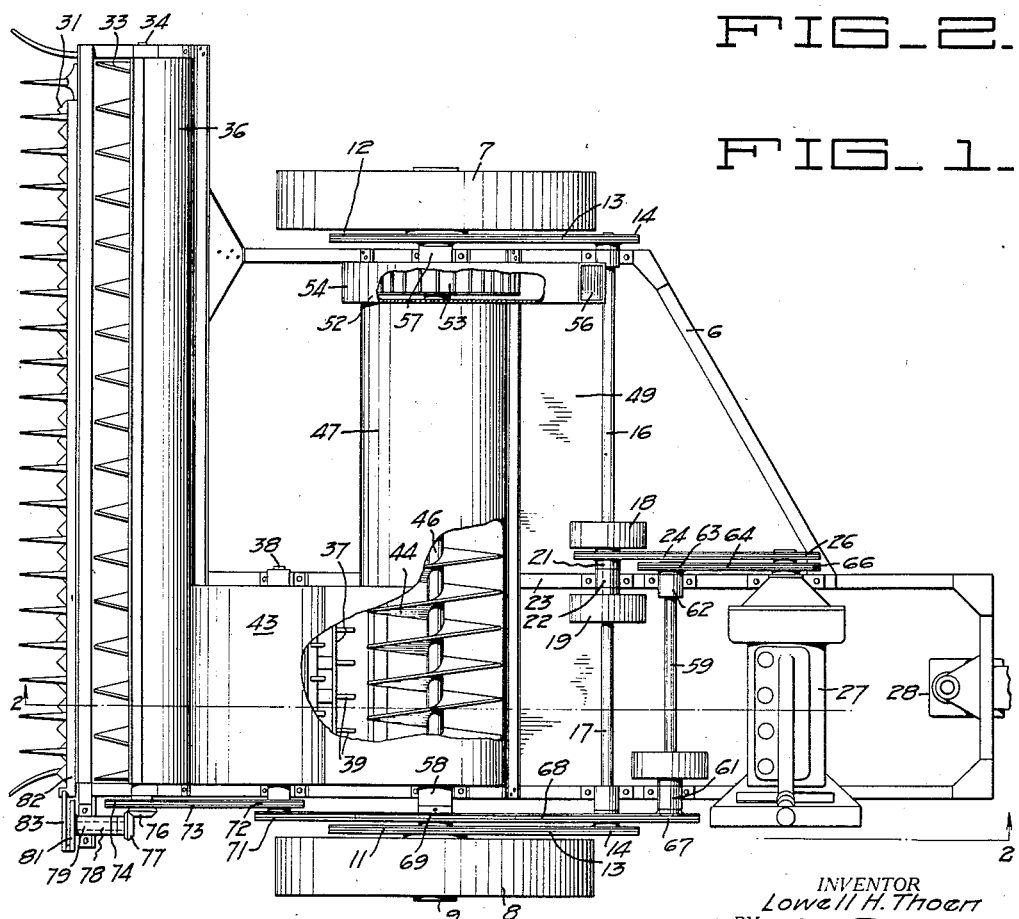
INVENTOR
Lowell H. Thoen
BY
White, Prost & Fryer
ATTORNEYS Patented Oct. 31, 1933

1,932,714

UNITED STATES PATENT OFFICE 1,932,714

HARVESTER

Lowell H. Thoen, Stockton, Calif., assignor to Caterpillar Tractor Co., San Leandro, Calif., a corporation of California Application May 28, 1929. Serial No. 366,560

35 Claims. (Cl. 56—21)

My invention relates to harvesting machinery and is especially concerned with machinery for cutting and threshing standing grain.

In harvesting operations it has in the past been customary to employ relatively large bulky harvesters which cut and subsequently thresh the grain during their progress over a field. Such machines require a large crew of operators and furthermore entail the use of a separate propelling mechanism for transporting them over the terrain being harvested. Not only does this scheme of operating entail the simultaneous use at one point of a large harvesting crew but also entails the use of a motive unit which might otherwise be employed in different work. There are various economic reasons for reducing the size of the harvesting unit but a plurality of such units thereby becomes necessary to effect substantially the same amount of work, thus entailing as well the employment not only of sundry crews of operators but also the utilization of an equal number of tractive or motive units.

It is therefore an object of my invention to provide a self propelled harvesting unit.

Another object of my invention is to provide a self propelled harvester which requires the attention of a minimum number of operators.

Another object of my invention is to provide a self propelled harvester which is relatively light, simple and cheap, so that a number of said units can be economically employed.

The foregoing and other objects are attained in the embodiment of the invention shown in the drawing, in which Fig. 1 is a plan of a self propelled harvester in accordance with my invention, portions being broken away to disclose the interior construction.

Fig. 2 is a cross section on the line 2—2 of Fig. 1.

In its preferred form, the self propelled harvester of my invention includes a framework on which is mounted a source of power, the source of power being connected to the supporting elements in such a way that the harvester can be steered thereby and the framework also carrying a grain cutting and threshing mechanism operable while the vehicle is propelled over a field.

In constructing the device of my invention I preferably provide, as disclosed in the drawing, a frame 6 constituted of metal shapes so fabricated as to provide a convenient attachment for various motive and harvesting units. The frame at either side is supported on ground engaging wheels 7 and 8 which are rotatably mounted on a through shaft 9. Proximate each wheel is mounted one of two sprockets 11 and 12 which rotate in unison with the wheels.

For selectively driving the wheels 7 and 8 to effect steering of the vehicle I connect each wheel by a sprocket chain 13 and sprocket 14 to individual drive shafts 16 and 17, in turn connected through individually operable clutches 18 and 19 with a central drive shaft 21 which is journalled as at 22 on a frame member 23. The shaft 21 is connected by a chain 24 to a sprocket 26 on the source of power 27, in this instance an internal combustion engine. The engine is affixed to a rearward extension of the frame 6 and the weight thereof together with a portion of the weight of the entire vehicle is partially borne by a caster wheel 28 vertically pivoted to the frame for free rotary movement with respect thereto. By properly and selectively operating the clutches 18 and 19, the vehicle operator can selectively apply power from the source 27 to either or both of wheels 7 and 8 and the vehicle can correspondingly be steered. The caster wheel 28 automatically adjusts itself to the direction of motion of the frame 6.

At the forward or leading edge of the frame and largely balancing the weight of the source of power and rearward extension thereof is mounted suitable mechanism for cutting and threshing grain. This harvesting mechanism preferably includes a sickle 31 of the customary type suitably secured to the leading edge of the framework which may be additionally supported by runners 32 adapted to glide over the ground. The sickle is effective to cut standing grain as the harvester is advanced over a field, and to receive the grain so cut I provide on the frame 6 an auger 33. This is a spiral conveyor mounted on a central shaft 34 and partially enclosed in a housing 36. Grain cut by the sickle 31 throughout its length is deposited in the housing 36 and is propelled toward one end thereof.

Immediately to the rear of auger 33 and adapted to receive grain from within housing 36 is a cylinder 37 of the customary type which is journalled in the frame with its axial shaft 38 parallel to shaft 34 and transverse to the direction of advance of the harvester. The cylinder carries teeth 39 in the usual fashion which interengage with teeth 41 fastened to concaves 42 suitably disposed in the framework. The unit composed of the cylinder and concaves is preferably enclosed in a housing 43 of suitable contour to effect proper threshing of the grain kernels from the grain straw.

To receive the threshed kernels and straw from the cylinder and concave unit I preferably dispose a separating auger 44 on the frame 6 to the rear of the cylinder 37. This auger is disposed with its central shaft 46 parallel to the axis 38 of the cylinder and parallel to the shaft 34 of the auger 33. The separating auger is enclosed in a suitable housing 47 which around its lower periphery is interrupted to afford room for separating sieves 48. The auger itself is of the spiral conveyor type and receives the material at one end from the cylinder and concave and propels the mixed grain kernels and straw toward the opposite end.

During the advancement of such material by the auger, the grain kernels drop gravitally through the sieves 48 and are received in a grain bin 49 suitably supported on the frame 6 and provided with a convenient outlet 51 controllable by the operator. As the grain kernels and grain straw advance toward the far end of the separating auger 44 a complete separation thereof is effected so that the sole material remaining at the terminus of the auger 44 is straw from which all grain kernels have been gravitally separated.

This straw customarily is returned in a broadcast fashion to the field from which the grain is being cut and to effect such result I preferably mount at the terminal end of the separating auger a fan or blower 52 which comprises an impeller 53 within a suitably contoured casing 54 and is arranged preferably with the impeller 53 mounted on the auger shaft 46. The centrifugal action of the relatively rapidly rotating impeller 53 is such as to discharge the straw through an outlet 56 to fall broadcast on the field over which the machine is being operated. Conveniently the shaft 46 on which the blower and the auger 44 are mounted is journalled on the frame 6 by journal boxes 57 and 58 and can readily form the axle 9 on which the wheels 7 and 8 are freely rotatable.

In order to drive the various moving elements of the harvesting mechanism I preferably utilize the source of power 27 which is effective to propel the vehicle over the field. However, the connection between the harvesting mechanism and the source of power is preferably independent of the connection to the various wheels so that the vehicle can be advanced without harvesting, if desired, or so that the harvesting operation can be carried on while the vehicle is stationary.

To this end I preferably dispose a power shaft 59 in journals 61 and 62 secured to the frame 6. One end of the power shaft 59 carries a sprocket 63 engaging a chain 64 which encompasses a sprocket 66 on the shaft of the engine 27. The other end of power shaft 59 likewise carries a sprocket 67, connected by a chain 68 with a drive sprocket 69 fixed on shaft 46 for rotating the separating auger 44 and the blower impeller 53. The chain 68 is continued to encompass a sprocket 71 affixed to the end of the cylinder shaft 38 for rotating the cylinder at a rapid rate.

Also mounted on the cylinder shaft is a sprocket 72 propelling a chain 73 meshing with a sprocket 74 fastened on the end of auger shaft 34 for rotating the receiving auger. This shaft also carries a bevel gear 76 meshing with a bevel gear 77 on a longitudinal shaft 78 journalled, as at 79, on the frame 6 and at its forward end carrying a crank disc 81. Connecting the crank disc and sickle bar 82 of the sickle 31 is a pitman 83 for imparting suitable reciprocating motion to the sickle bar. With this arrangement, power originating at the single source 27 is transmitted to all of the several cutting and threshing mechanisms to impart the requisite motion thereto for effecting cutting and separation of the standing grain in the field over which the harvester is propelled and steered.

In this fashion I have provided a self contained vehicle requiring a minimum number of operators and carrying its own motive power for propelling it in any direction over a field and for simultaneously cutting and threshing standing grain. Not only does such a self propelled harvester increase materially the flexibility of the harvesting operation but it also is a vehicle sufficiently light and simple to entail a small capital expenditure so that a given harvest can be effected by a large number of such machines at a reduced cost and at the same time separate tractive units are freed for other work.

It is to be understood that I do not limit myself to the form of the self propelled harvester shown and described herein, as the invention, as set forth in the following claims may be embodied in a plurality of forms.

I claim:

1. A self propelled harvester comprising a frame, a sickle at the leading edge of said frame, an auger immediately behind said sickle and adapted to receive grain cut by said sickle and to convey said cut grain toward an end thereof, a cylinder and concaves arranged at said end to receive grain from said auger, a separating auger adapted to receive grain from said cylinder and concaves, means for receiving grain kernels from said separating auger, means for distributing grain straw received from said separating auger, and a source of power on said frame for propelling said harvester, and driving said sickle, said auger, said cylinder, said separating auger and said distributing means.

2. A self propelled harvester comprising a frame, a sickle bar disposed transversely at the leading edge of said frame, an auger immediately behind said sickle and disposed parallel thereto, said auger being adapted to convey material toward an end thereof, a cylinder behind said auger and disposed with its axis parallel thereto, a separating auger behind said cylinder and disposed parallel to the axis thereof, and a source of power on said frame for propelling said harvester, and driving said sickle, said auger, said cylinder, and said separating auger.

3. A self propelled harvester comprising a frame, a sickle on said frame for cutting standing grain, an auger on said frame for receiving cut grain and for conveying said cut grain toward an end thereof, a cylinder and concaves on said frame for threshing grain received by said auger, a separating auger on said frame for receiving grain from said cylinder and concaves, and means on said frame for propelling said harvester and for driving said sickle, said auger, said cylinder and said separating auger.

4. A self propelled harvester comprising a portable frame, an auger on said frame for receiving cut grain and for conveying said cut grain toward an end thereof, a cylinder and concaves on said frame for receiving grain from said auger, and a separating auger on said frame for receiving grain from said cylinder and concaves.

5. A self propelled harvester comprising a frame, a pair of wheels at opposite sides of said frame, a caster wheel at the rear of said frame, a source of power on said frame, means for selectively connecting the wheels of said pair to said source of power for steering said harvester, grain cutting and threshing mechanism on said frame, and means for transmitting power from said source of power to said grain cutting and threshing mechanism.

6. A self propelled harvester comprising a frame, a pair of wheels at opposite sides of said frame, a caster wheel at the rear of said frame, a source of power on said frame, means for selectively connecting the wheels of said pair to said source of power for steering said harvester, a sickle at the leading edge of said frame, an auger on said frame for receiving grain cut by said sickle, a cylinder and concaves on said frame for threshing grain cut by said sickle, a separating auger on said frame for separating grain threshed by said cylinder and concaves, and means for connecting said source of power independent of the connection thereof to said wheels to said sickle, said cylinder and said separating auger.

7. A three-wheeled self-propelled combined harvester thresher including two steering wheels and a caster wheel.

8. In a combined harvester-thresher, a pair of wheels, a separator therebetween, a header and a thresher forward of said separator and a motor behind said separator.

9. In a harvester, a pair of driving wheels and a caster wheel rearwardly thereof.

10. In a harvester, a frame, a pair of wheels centrally of said frame, shoes on the front end of said frame, and a caster wheel at the rear of said frame.

11. In a combined harvester-thresher, a frame, a pair of driving wheels centrally of said frame, shoes on the front of said frame, a caster wheel at the rear of said frame, header and thresher mechanism in the fore part of said frame, a separator in the central portion of said frame, and a motor in the rear portion of said frame.

12. In a combined harvester-thresher, a feeder auger, a thresher, and a separating auger, said augers and said thresher having parallel axes of rotation.

13. In a combined harvester-thresher, a feeder auger, a thresher, and a separating auger, said augers and said thresher having parallel axes of rotation normal to the direction of advance of said harvester-thresher.

14. In a combined harvester-thresher, a feeder auger, a separating mechanism, and a thresher for transferring material from said feeder auger into said separating mechanism.

15. In a combined harvester-thresher, a feeder auger, a separating auger, and a thresher for transferring material from said feeder auger to said separating auger.

16. In a combined harvester-thresher, a thresher, a rotary separator positioned to receive material directly from the thresher, and a header having means to convey material toward the thresher and in a direction transverse to the direction of advance of said harvester-thresher.

17. In a combined harvester-thresher, a thresher, a rotary separator positioned to receive material directly from the thresher, and a header having a rotary screw conveyor extending transverse to the direction of advance of said harvester-thresher to convey material toward the thresher.

18. In a combined harvester-thresher, a rotary thresher, a rotary separator positioned to receive material from the thresher, means to support said thresher and said separator with their axes of rotation substantially parallel, and a header having means to convey material toward the thresher and in a direction transverse to the direction of advance of said harvester-thresher.

19. In a combined harvester-thresher, a rotary thresher, a rotary separator positioned to receive material from the thresher, means to support said thresher and said separator, with their axes of rotation substantially parallel and extending transverse to the direction of advance of said harvester-thresher, and a header having means to convey material toward the thresher and in a direction transverse to the direction of advance of said harvester-thresher.

20. In a combined harvester-thresher, a header having a rotary screw conveyor to feed material toward an end thereof, a rotary thresher positioned adjacent said end and of less width than the length of said screw conveyor, and a rotary separator to receive material from the thresher.

21. In a combined harvester-thresher, a header having a rotary screw conveyor to feed material toward an end thereof, a rotary thresher positioned adjacent said end and of less width than the length of said screw conveyor, and a rotary separator to receive material from the thresher, said thresher being positioned between the screw conveyor and the separator, and the axes of rotation of said screw conveyor, thresher and separator being substantially parallel.

22. In a combined harvester-thresher, a header having a rotary screw conveyor to feed material toward an end thereof, a rotary screw separator, and a rotary thresher positioned adjacent said end of the screw conveyor for transferring material from said end to said separator.

23. In a combined harvester-thresher, a header having a rotary screw conveyor to feed material toward an end thereof, a rotary screw separator, and a rotary thresher positioned adjacent said end of the screw conveyor for transferring material from said end to said separator, the thresher being arranged behind the screw conveyor with the rotational axes of the thresher and separator substantially parallel.

24. In a combined harvester-thresher, a header having a screw conveyor for feeding material transversely of the direction of advance of the harvester-thresher, a separating auger behind the screw conveyor and spaced therefrom with its axis of rotation substantially parallel to that of the screw conveyor, and a rotary thresher interposed between the separating auger and the screw conveyor with its axis of rotation parallel to that of the screw conveyor, the width of the thresher being materially less than the length of said screw conveyor.

25. A self-propelled harvesting machine of the class described having a source of power, a pair of ground-engaging wheels, means for selectively engaging either one or both of said wheels with said source of power whereby the machine can be steered in any direction or driven straight ahead, and a caster wheel positioned rearwardly of said pair of wheels and free of any connection therewith, whereby the caster wheel is free to adjust itself automatically in response to the direction of movement of the machine.

26. A machine of the class described having a pair of power-driven ground-engaging wheels, means for effecting steering of the machine by selectively terminating the application of power to either one of said wheels, and a caster wheel automatically adjustable in response to the direction in which the machine is steered by said traction devices.

27. A machine of the class described having a pair of traction devices for supporting the machine on the ground, means for selectively conditioning either one of said traction devices to effect steering of the machine in either one of opposite directions, and a ground-engaging member spaced from said traction devices, said ground-engaging member being freely journaled for rotation about an upright axis whereby it is free to move in response to the direction in which the machine is steered by said traction devices.

28. In a combined harvester-thresher machine, a header having means for conveying material only transversely with respect to the line of draft of said machine to a position adjacent an end of said conveying means, a thresher positioned adjacent said end of said conveying means to receive the transversely conveyed material therefrom, and separating means positioned to receive material directly from said thresher.

29. In a combined harvester-thresher machine, a header having means for conveying material only transversely with respect to the line of draft of said machine to a position adjacent an end of said conveying means, a thresher positioned adjacent said end of said conveying means to receive the transversely conveyed material therefrom, and a rotary separator having an end positioned directly adjacent said thresher to receive directly material threshed by said thresher.

30. In a combined harvester-thresher machine, a header having means for conveying material only transversely with respect to the line of draft of said machine to a position adjacent an end of said conveying means, a thresher including a rotary cylinder positioned adjacent said end of said conveying means to receive the transversely conveyed material therefrom, and a rotary separator having an end positioned directly adjacent said thresher to receive directly material threshed by said thresher, the axes of rotation of said cylinder and said separator being substantially parallel.

31. In a combined harvester-thresher machine, a header having a rotary screw conveyor for transporting material transversely with respect to the line of draft of said machine and to a position adjacent an end of said conveyor, a rotary separator, and a thresher including a rotary cylinder interposed between said conveyor end and an end of said separator to receive the conveyed material, to thresh said material and to transfer said material into said separator.

32. In a combined harvester-thresher machine, a header having a rotary screw conveyor for transporting material transversely with respect to the line of draft of said machine and to a position adjacent an end of said conveyor, a rotary separator, and a thresher including a rotary cylinder interposed between said conveyor end and an end of said separator to receive the conveyed material, to thresh said material and to transfer said material into said separator, the axes of rotation of said separator and said cylinder being substantially parallel.

33. In a combined harvester-thresher machine, a header having a rotary screw conveyor for transporting material transversely with respect to the line of draft of said machine and to a position adjacent an end of said conveyor, a rotary separator, and a thresher including a rotary cylinder interposed between said conveyor end and an end of said separator to receive the conveyed material, to thresh said material and to transfer said material into said separator, the axes of rotation of said separator, said conveyor and said cylinder being all substantially parallel.

34. In a combined harvester-thresher machine, a header having a rotary screw conveyor for transporting material to a position adjacent an end of said conveyor, said conveyor being positioned to move said material transversely with respect to the line of draft of said machine, a thresher including a rotary cylinder positioned adjacent said end of said conveyor and in back thereof to receive material directly from said conveyor, the axis of rotation of said cylinder being substantially parallel to that of said conveyor, and a rotary separator positioned in back of said thresher to receive material directly from said thresher, the axis of rotation of said separator being substantially parallel to the axes of rotation of both said conveyor and said cylinder.

35. In a harvester, a main frame, means for supporting said main frame comprising a pair of steering traction devices and a caster wheel at the rear of the frame, said caster wheel being free to rotate in any direction about an upright axis responsive to the direction of steering of the harvester.

LOWELL H. THOEN.